US011444835B2

(12) United States Patent
Seetharaman et al.

(10) Patent No.: US 11,444,835 B2
(45) Date of Patent: Sep. 13, 2022

(54) SYSTEM AND METHOD OF MAINTENANCE OF NETWORK SLICE TEMPLATES FOR SLICE ORCHESTRATION

(71) Applicant: Wipro Limited, Bangalore (IN)

(72) Inventors: Swaminathan Seetharaman, Chromepet (IN); Ravi Kumar Emani, Bangalore (IN)

(73) Assignee: Wipro Limited, Bangalore (IN)

( * ) Notice: Subject to any disclaimer, the term of this patent is extended or adjusted under 35 U.S.C. 154(b) by 293 days.

(21) Appl. No.: 16/660,876

(22) Filed: Oct. 23, 2019

(65) Prior Publication Data

US 2021/0075678 A1 Mar. 11, 2021

(30) Foreign Application Priority Data

Sep. 6, 2019 (IN) .............................. 201941036038

(51) Int. Cl.
*H04L 41/084* (2022.01)
*H04L 41/0893* (2022.01)
*H04L 41/5025* (2022.01)
*H04L 41/5041* (2022.01)
*H04W 28/02* (2009.01)

(52) U.S. Cl.
CPC ...... *H04L 41/0843* (2013.01); *H04L 41/0893* (2013.01); *H04L 41/5025* (2013.01); *H04L 41/5048* (2013.01); *H04W 28/0268* (2013.01)

(58) Field of Classification Search
CPC ............. H04L 41/5048; H04L 41/0843; H04L 41/0893; H04L 41/5025; H04W 24/08; H04W 28/0268
See application file for complete search history.

(56) References Cited

U.S. PATENT DOCUMENTS

2017/0054595 A1* 2/2017 Zhang ..................... H04L 41/12
2017/0142591 A1* 5/2017 Vrzic ................... H04L 47/2408

OTHER PUBLICATIONS

Geng, L., et al., "Network Slicing Architecture draft-geng-netslices-architecture-02", IETF Trust, Jul. 2017, 27 pages.
Hedman, P., "Description of Network Slicing Concept", NGMN Alliance, Jan. 13, 2016, 7 pages.
"Network Slicing for 5G Networks & Services", 5G Americas, Nov. 2016, 34 pages.

(Continued)

*Primary Examiner* — Elton Williams
(74) *Attorney, Agent, or Firm* — Finnegan, Henderson, Farabow, Garrett & Dunner, LLP

(57) ABSTRACT

A method and system for maintenance of network slice templates for slice orchestration is disclosed. The method includes extracting a plurality of parameters from a template data within a template request message and determining at least one network slice template from a plurality of templates, based on comparison of the plurality of parameters with parameters associated with the plurality of templates. The method further includes receiving performance feedback for each of the at least one network slice template based on usage of the at least one network slice template and determining modifications required to be performed on the at least one network slice template, based on the performance feedback. The method includes adapting the at least one network slice template based on the determined modifications.

16 Claims, 8 Drawing Sheets

(56) References Cited

OTHER PUBLICATIONS

Qiang, L. et al., "Technology independent Information Model for Network Slicing draft-qiang-comes-netslicing-information-model-01", IETF Trust, Oct. 2017, 26 pages.
3GPP TR 28.801 v15.1.0 (Jan. 2018), "3rd Generation Partnership Project; Technical Specification Group Services and System Aspects; Telecommunication management; Study on management and orchestration of network slicing for net generation network (Relase 15)", 2018, 75 pages.

\* cited by examiner

SYSTEM AND METHOD OF MAINTENANCE OF NETWORK SLICE TEMPLATES FOR SLICE ORCHESTRATION

TECHNICAL FIELD

This disclosure relates generally to maintenance of network slice templates and more particularly to method and system for maintenance of network slice templates for slice orchestration.

BACKGROUND

European Telecommunications Standards Institute (ETSI) Management and Orchestration (MANO) architecture provides a framework for management and orchestration of virtual infrastructure to deliver end-to-end (e2e) services. Third Generation Partnership Project (3GPP) 32-series specifications and TM forum provide an architecture and mechanism of e2e service orchestration. However, networks up to Fourth Generation (4G) have limitations due to the technology as well as the network architecture to ensure service Key Performance Indicators (KPIs) under resource constraints, and it involves significant network management overhead in terms of manual intervention to ensure service KPI adherence are within acceptable limits. The advent of Fifth Generation (5G) networks brings diverse use cases, support of heterogeneous access technologies such as 5G New Radio (NR), small cells, Wireless Fidelity (Wi-Fi), 4G, etc. including simultaneous connectivity to multiple access networks, and the cloudification of the Radio Access Network (RAN). This increases the requirements in terms of physical infra-structure manifold, and also makes network management much more complex.

Global System for Mobile Communications Association (GSMA) and 3GPP have proposed network slicing as an effective mechanism to cater to diverse use cases while using optimal resources, as well as ensuring that the management and orchestration does not too complex to handle. Network slicing involves creation of different slices of the network from an end-to-end perspective. Network slices may be created to cater to diverse set of use cases, specific industry vertical requirements (e.g., smart factory, autonomous vehicles, enterprises, etc.), category of subscribers (e.g., normal, gold, premium, etc.) or a hybrid of all these. A key pre-requisite for network slice creation is use of an appropriate network slice template which may contain information such as resources required, constraints, target KPIs, type of services it can serve, security and isolation requirements, etc.

One of the conventional methods tries to address the above by suggesting a network slicing architecture which also includes template management mechanism. The conventional method merely states that a network slice template consists of complete description of the structure, configuration and the plans/workflows for how to instantiate and control the network slice instance during its life cycle. However, this conventional method fails to disclose the any mechanism of network slice template creation and usage for addressing specific problems.

Another conventional method defines a network slice template as a complete description of the structure, configuration and the plans/work flows for how to instantiate and control the network slice instance during its life cycle. It states that a network slice template enables the instantiation of a network slice, which has certain network characteristics (for example, ultra-low latency, ultra-reliability, value-added services for enterprises, etc.) most suitable for a specific set of services, and the network slice templates refer to required physical and logical resources and/or to sub-network templates. This conventional method also provides a description of the structure (and contained components) and configuration of the sub-network instances and the plans/work flows for how to instantiate it. A sub-network template refers to physical and logical resources and may refer to other sub-network templates. However, this conventional method fails to address the steps involved in the creation and maintenance of templates, mapping of service specifications to network slice templates and subnet-templates.

Yet another conventional method specifies that a network slice template defines the setup of the slice, including the components that need to be instantiated, the features to enable, configurations to apply, resource assignments and all associated workflows, including all aspects of the life cycle (such as upgrades and changes). In this conventional method, the network slice templates contain machine-readable parts, similar to Organization for the Advancement of Structured Information Standards (OASIS) Topology and Orchestration Specification for Cloud Applications (TOSCA) models, which support automation. However, this conventional method fails to describe the slicing template contents and template handling functions.

Another conventional method states that the preparation phase of network slice lifecycle management includes the creation and verification of network slice template, the on-boarding of these, preparing the necessary network environment which are used to support the lifecycle of network slice instances and any other preparations that are needed in the network. However, this conventional method fails to describe the slice template contents as well as the steps involved in the creation and maintenance of templates, mapping of service specifications to network slice template and subnet-templates.

Yet another conventional method proposes an information model for network slicing. It describes the resource types (compute, storage, networking) for slices, reliability aspects (in terms of resource), resource usage type (exclusive, shared but pre-emptive, shared and non-preemptive) and Quality of Service (QoS) criteria. All these parameters are monitored and reported to the management system in case of violation of relevant thresholds. However, this conventional prior art fails to disclose mechanism such as creation and maintenance of templates, mapping templates to service types, hierarchy of network to subnet level slicing, mapping to network functions, etc. Thus, this conventional method cannot be applied for creating and maintaining templates and enable the definition and instantiation of network slices.

SUMMARY

In one embodiment, a method of maintenance of network slice templates for slice orchestration is disclosed. The method includes extracting, by a template controller, a plurality of parameters from a template data within a template request message. The method further includes determining, by the template controller, at least one network slice template from a plurality of templates, based on comparison of the plurality of parameters with parameters associated with the plurality of templates. The method includes receiving, by the template controller, performance feedback for each of the at least one network slice template based on usage of the at least one network slice template. The method further includes determining, by the template controller, modifications required to be performed on the at least one network slice template, based on the performance feedback. The method includes adapting, by the template controller, the at least one network slice template based on the determined modifications.

In another embodiment, a system of maintenance of network slice templates for slice orchestration is disclosed. The system includes at least one processor and a memory communicatively coupled to the processor. The memory stores processor instructions, which, on execution, causes the processor to extract a plurality of parameters from a template data within a template request message. The processor instructions further cause the processor to determine at least one network slice template from a plurality of templates, based on comparison of the plurality of parameters with parameters associated with the plurality of templates. The processor instructions cause the processor to receive performance feedback for each of the at least one network slice template based on usage of the at least one network slice template. The processor instructions further cause the processor to determine modifications required to be performed on the at least one network slice template, based on the performance feedback. The processor instructions cause the processor to adapt the at least one network slice template based on the determined modifications.

In yet another embodiment, a non-transitory computer-readable storage medium is disclosed. The non-transitory computer-readable storage medium having stored thereon, a set of computer-executable instructions causing a computer comprising one or more processors to extract a plurality of parameters from a template data within a template request message; determine at least one network slice template from a plurality of templates, based on comparison of the plurality of parameters with parameters associated with the plurality of templates; receive performance feedback for each of the at least one network slice template based on usage of the at least one network slice template; determine modifications required to be performed on the at least one network slice template, based on the performance feedback; and adapt the at least one network slice template based on the determined modifications.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
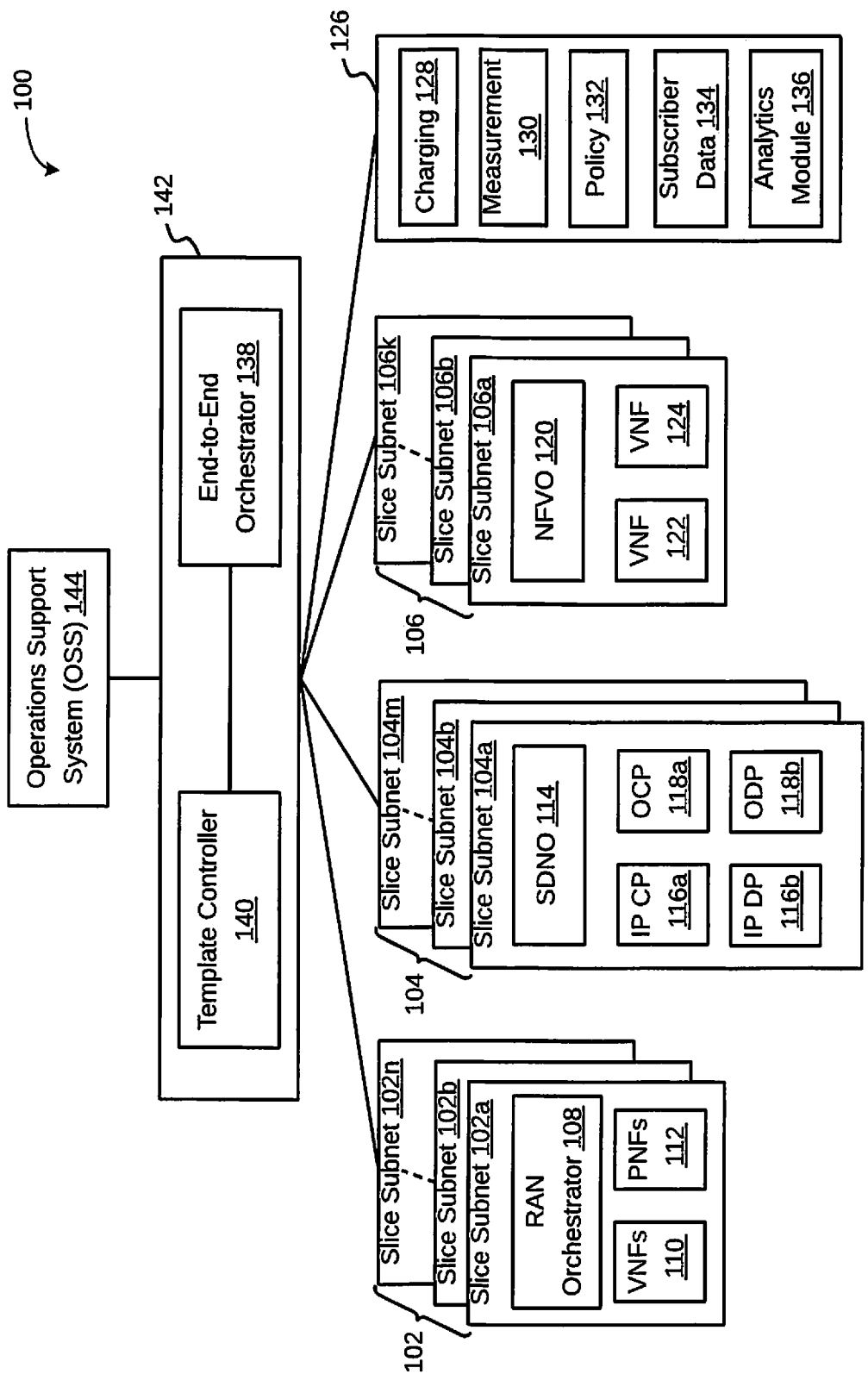
FIG. 1 is a block diagram of a system for maintenance of network slice templates for slice orchestration, in accordance with an embodiment.

Referring now to FIG. 1, a block diagram of a system 100 for maintenance of network slice templates for slice orchestration is illustrated, in accordance with an embodiment. The system 100 displays an end-to-end view of various components in a network that is configured for network slicing. The system 100 depicts a plurality of network segments, for example, a Radio Access Network (RAN) network segment 102, a transport/backhaul network segment 104, and a core network 106. Each of the plurality of network segments include a plurality of slice subnets. By way of an example, the RAN network segment 102 includes slice subnets 102a to 102n. By way of another example, the transport/backhaul network segment 104 includes slice subnets 104a to 104m. By way of yet another example, core network 106 includes slice subnets 106a to 106k.

Each of the plurality of network segments may include network functions and interconnections. Further, each of the plurality of network segments may also include a domain controller or orchestrator. The RAN network segment 102 may include a RAN Orchestrator 108 and a plurality of Virtual Network Functions (VNFs) 110 and a plurality of Physical Network Functions (PNFs) 112. The transport/backhaul network segment 104 may include a Software Defined Network Orchestrator (SDNO) 114, an IP Control Plane (IP CP) 116a, an IP Data Plane (IP DP) 116b, an Optical Control Plane (OCP) 118a and an Optical Data Plane (ODP) 118b. The core network segment 106 may include a Network functions virtualization Orchestrator (NFVO) 120, VNF 122, VNF 124, and their interconnections.

In an embodiment, for each of the plurality of network segments, a domain controller or orchestrator may be common across a corresponding plurality of slice subnets. By way of an example, the RAN orchestrator 202 may be common across the slice subnets 102a to 102n. In other words, the domain controller or orchestrator may be slice-agnostic. Alternatively, a separate domain controller or orchestrator may exist for each slice depending on a deployment scenario.

Common functions 126 across each of the plurality of network segments, are slice-agnostic functions and are thus depicted separately. The common functions, for example, may include, charging 128, measurement 130, policy 132, subscriber data 134, and an analytics module 136. The common functions 126 may be realized as being part of a separate network segment that includes one slice sub-net, which is shared across all the network slices.

The system 100 may further include an end-to-end orchestrator 138 that may perform service orchestration, slice orchestration, and resource orchestration functions. The end-to-end orchestrator 138 may further be communicatively coupled to a template controller 140 within an orchestration plane 142. The template controller 140 is configured to maintain network slice templates for slice orchestration. The template controller is further explained in detail in conjunction with FIG. 2. The interface between the end-to-end orchestrator 138 and the template controller 140 may be a REpresentational State Transfer (REST) interface which is secured using https, for example, or the interface may be a proprietary message-based interface.

The end-to-end orchestrator 138 and the template controller 140 may be communicatively coupled to each of the plurality of network segments through a REST interface, netconf/yang-based interface (running over Transport Layer Security (TLS) or Stream Control Transmission Protocol (SCTP) or TCP/IP, or any proprietary interface for configuration, notification/reporting, and monitoring data transfer from the plurality of network segments to the end-to-end orchestrator 138.

The system 100 may further include an Operations Support System (OSS) 144, which may include suitable logic, circuitry, interfaces, and/or code. The OSS 144 is communicatively coupled to the end-to-end orchestrator 138 and the template controller 140 through an interface, which may be a REST interface (typically secure) or may use well-known protocols such as Simple Network Management Protocol (SNMP) or Netconf. The interface may also be proprietary.

Figure 2:
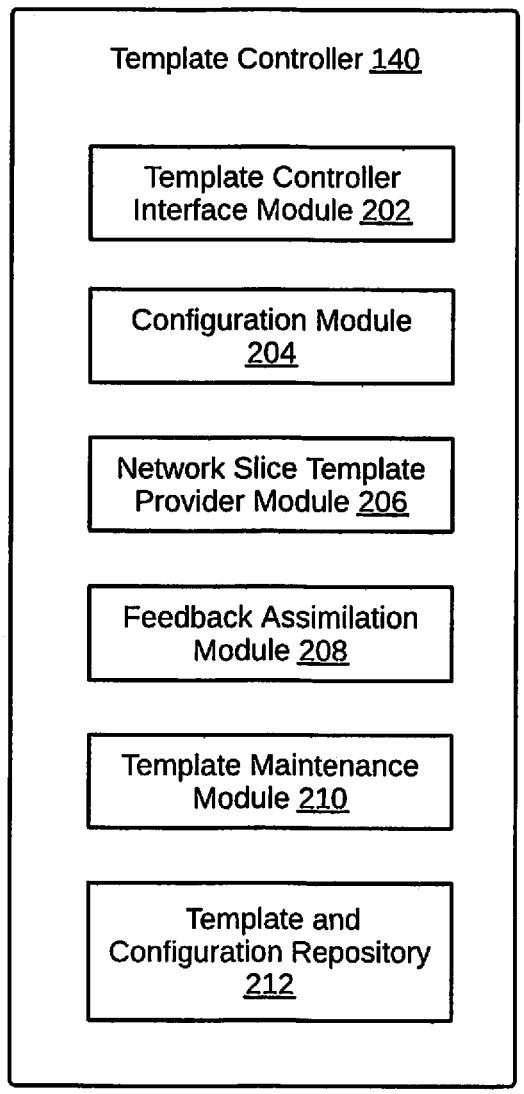
FIG. 2 is a block diagram of a template controller configured to maintain network slice templates for slice orchestration, in accordance with an embodiment.

Referring now to FIG. 2, a functional block diagram of the template controller 140 configured to maintain network slice templates for slice orchestration is illustrated, in accordance with an embodiment. As depicted in the FIG. 1, the template controller 140 is located within the orchestration plane 142. The template controller 140 includes a template controller interface module 202, a configuration module 204, a network slice template provider module 206, a feedback assimilation module 208, a template maintenance module 210, and a template and configuration repository 212.

The template controller interface module 202 may receive a Network Slice Template Request message (NS-TMPLT-RQST) from the end-to-end orchestrator 138. Thereafter, the template controller interface module 202 may extract relevant information from the NS-TMPLT-RQST. In an embodiment, the NS-TMPLT-RQST may include, but is not limited to service type(s) or categories to be supported (SERV-TYPE), one or more Service Level Agreements (SLAs) or one or more Key Performance Indicators (KPI) or performance requirements (TARGET-SLA-KPI), Capacity (CAP), User density (USER-DEN), isolation and sharing levels (ISO-SHARING), mobility requirements (MOB-RQMT), and Security, Policy requirements/constraints (SEC-POL-RQMTS). The NS-TMPLT-RQST may also include additional characteristics, such as, cost of operation, priority and pre-emption, reliability (ADDTNL-CHAR).

The template controller interface module 202 may also receive a basic network slice template (BASIC-NSLT) or a basic slice sub-net template (BASIC-NSSLT) from the OSS 144. The template controller interface module 202 may send it to the template maintenance module 210. The BASIC-NSLT and the BASIC-NSSLT may include (exemplary) service categories/types (SERV-CAT) that can be supported, one or more value ranges for SLAs/KPIs (TARGET-SLA-KPI-RANGES), zero or more constituent slice sub-net types (CONST-SLICE-SUBNET-TYPES) (i.e., the field is empty as there are no constituent slice sub nets), policy requirements (POL-RQMTS), supported capabilities (SLICE-CAPAB). The SLICE-CAPAB may include aspects such as mobility, isolation, security or any other specific capabilities, which may be vendor-specific, service-provider specific, or deployment-specific.

In an embodiment, the layout discussed above may be used by the BASIC-NSLT as well as the BASIC-NSSLTs, such that, the field CONST-SLICE-SUBNET-TYPES is empty, when there are no constituent slice sub-nets. The layout may also include valid contents in the BASIC-NSSLTs when a network slice sub-net is composed of sub-sub-nets (i.e., multiple levels of nesting of slice sub-nets).

The configuration module 204 is configured to store or enable all the configurations required for the operation of the template controller 140. The configurations, for example, may include thresholds, parameter values, pre-provisioned rules, policy constraints, etc. The configuration module 204 may also store the BASIC-NSLTs and the BASIC-NSSLTs in the template and configuration repository 212.

The network slice template provider module 206 extracts the required information from the NS-TMPLT-RQST and stores it as network slice template request contents (NS-TMPLT-RQST-CONTENTS) in the template and configuration repository 212. The network slice template provider module 206 also determines appropriate one or more BASIC-NSLTs and one or more adapted network slice templates. The network slice template provider module 206 derives parameters applicable for each network slice sub-net and also determines appropriate one or more BASIC-NSSLTs.

Further, the network slice template provider module 206 determines appropriate one or more network slice templates and one or more network slice sub-net templates. The network slice template provider module 206 creates or forms one or more new network slice templates as well as one or more new network slice sub-net templates. The network slice template provider module 206 additionally provides the appropriate one or more network slice template along with details of extent of match and suitability. Functionality of the network slice template provider module 206 is further explained in detail in conjunction with the FIG. 3, FIGS. 4A and 4B, FIG. 5, and FIG. 6.

The feedback assimilation module 208, is configured to collect feedback from the end-to-end orchestrator 138 about performance and effectiveness of orchestration after using the network slice template provided by the network slice template provider module 206. The feedback assimilation module 208 collects details for each slice sub-net, thereby enabling analysis on each slice sub-net template basis and making suitable adaptations subsequently. The feedback assimilation module 208 passes all aggregated data and analysis done on the collected data (to assess the effectiveness of the template provided by the network slice template provider module 206) to the template maintenance module 210 for taking suitable actions.

The template maintenance module 210 is configured to take suitable actions on network slice templates. The actions may include but are not limited to storing of BASIC-NSLTs and BASIC-NSSLTs when provisioned by the operator, conversion of network slice intent to appropriate templates and storing them in the template and configuration repository 212 (the conversion of intent may be done using pre-defined rules which may be adapted based on self-learning and feedback from the operator), storing adapted templates in the template and configuration repository 212 along with details of effectiveness during use, deletion of adapted templates if not used for a long time, or if it was consistently inefficient over a period of time, deletion of BASIC-NSLTs when instructed by the operator, and updating effectiveness scores of both basic and adapted network slice templates based on performance feedback received from the end-to-end orchestrator 138 to the feedback assimilation module 208.

The template and configuration repository 212 stores network slice templates, rules, thresholds, or parameter values, etc., which may be used by various modules within the template controller 140. The configuration module 204 may primarily write into the template and configuration repository 212, and all other modules in the template controller 140 may access data stored in the template and configuration repository 212, which is usually persistent.

Figure 3:
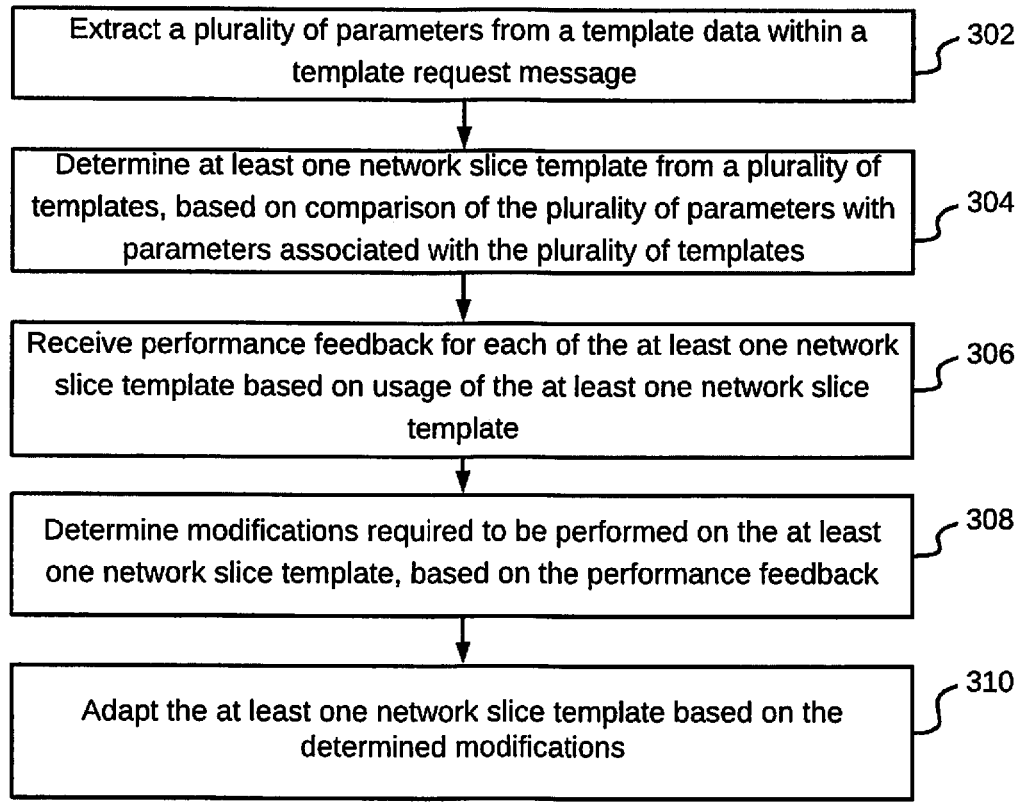
FIG. 3 is a flowchart of a method for maintenance of network slice templates for slice orchestration, in accordance with an embodiment.

Referring now to FIG. 3, a flowchart of a method for maintenance of network slice templates for slice orchestration is illustrated, in accordance with an embodiment. The template controller 140 may receive a template request message (NS-TMPLT-RQST) from the end-to-end orchestrator 138. The template controller interface module 202 within the template controller 140 may receive the NS-TMPLT-RQST. The template controller interface module 202 may then pass the NS-TMPLT-RQST to the network slice template provider module 206 in the template controller 140. At step 302, the template controller 140 may extract a plurality of parameters from a template data within the NS-TMPLT-RQST. The network slice template provider module 206 in the template controller 140 may extract the plurality of parameters and may then store the plurality of parameters as relevant information in NS-TMPLT-RQST-CONTENTS in the template and configuration repository 212. In an embodiment, the extraction of the plurality of parameters may be based on provisioned rules and mapping tables that may be pre-configured.

The data within the NS-TMPLT-RQST may include one or more of service categories to be supported (SERV-TYPE), performance requirements (TARGET-SLA-KPI), capacity (CAP), user density (USER-DEN), isolation and sharing levels (ISO-SHARING), mobility requirements (MOB-RQMT), security and policy requirements (SEC-POL-RQMTS), and additional characteristics (ADDTNL-CHAR). The ADDTNL-CHAR includes one or more of cost of operation, priority, pre-emption, and reliability. One or more of these details may be the plurality of parameters extracted from the NS-TMPLT-RQST.

The template controller 140 may then compare the plurality of parameters with parameters associated with a plurality of templates. The network slice template provider module 206 may perform the comparison. Based on the comparison, the template controller 140, at step 304, determines one or more network slice templates (one or more APPROP-NSLTs) from the plurality of templates. In an embodiment, the APPROP-NSLTs may be used without any modification. Such APPROP-NSLTs may be termed as ADAPTED-NSLTs. This is further explained in detail in conjunction with FIGS. 4A and 4B. In another embodiment, the APPROP-NSLTs may be determined by modifying one or more of the plurality of templates. Such APPROP-NSLTs may be termed as ENRICHED-BASIC-NSLTs and the ENRICHED-ADAPTED-NSLTs. This is further explained in detail in conjunction with FIG. 5. In yet another embodiment, when the one or more APPROP-NSLTs do not meet predefined criteria, one or more new NSLTs may be created. Such NSLTs may be termed as FORMED-NS-TMPLTs. This is further explained in detail in conjunction with FIG. 6.

At step 306, the template controller 140 may receive performance feedback for each of the one or more APPROP-NSLTs based on usage of the one or more APPROP-NSLTs. The feedback assimilation module 208 within the template controller 140 may receive performance feedback from the end-to-end orchestrator 138. In an embodiment, the feedback assimilation module 208 may obtain information about which of the one or more APPROP-NSLTs was chosen by the end-to-end orchestrator 138. Subsequently, the feedback assimilation module 208 may receive periodic feedback from the end-to-end orchestrator 138. The periodic feedback may include information regarding usage of selected APPROP-NSLTs, effectiveness of the APPROP-NSLTs, modifications performed on the selected APPROP-NSLTs, effectiveness of such modification, and implications of such modifications. Effectiveness may be determined based on suitability of content within the APPROP-NSLTs in meeting the TARGET-SLA-KPIs and other requirements of a network slice and the TARGET-SLA-KPIs and other requirements of the services that were mapped on to that network slice. In particular, effectiveness of suitability of constraints and resource allocation guidelines, and their associated implications may be determined. The feedback assimilation module 208 may assimilate this feedback, and may then initiate an assessment to determine if there is a need for updating one or more of the one or more APPROP-NSLTs, thresholds, or rules.

Based on the performance feedback, the template controller 140, at step 308, determines modifications required to be performed on the one or more APPROP-NSLTs. In an embodiment, the feedback assimilation module 208 may determine the required modifications. The feedback assimilation module 208 may assess whether there is a need for modification or removal an ADAPTED-NSLT. Based on the assessment, the feedback assimilation module 208 may perform the necessary actions. To this end, the feedback assimilation module 208 observes the use of a template (NSLT or NSSLT). If a particular template is not used at all over a period of time or found to be ineffective (such that, effectiveness is less than effectiveness-lower-threshold), the feedback assimilation module 208 determines that the template may be marked inactive or may be removed.

In an embodiment, if the modifications done by the end-to-end orchestrator 138 to an ADAPTED-NSLT was effective, or if the enrichment done to a BASIC-NSLT was effective, such that, effectiveness is greater than effectiveness-upper-threshold, the feedback assimilation module 208 triggers the template maintenance module 210 to take necessary actions, which may include adaptation of the template. In case the effectiveness of the template (ADAPTED-NSLT as well as BASIC-NSLT) was significantly different from previous usage, the feedback assimilation module 208 does a deeper analysis of the factors contributing to this difference and may decide to trigger modification if the same trend continues for more than 'n' iterations. The value of 'n,' for example, may be 3.

In an embodiment, the end-to-end orchestrator 138 may have determined new implications due to contents within a template, which were not captured originally, the feedback assimilation module 208 may decides to make modifications to the template. In any of the cases discussed above, if the template has to be modified, the network slice template provider 206 may trigger the template maintenance module 210.

The feedback assimilation module 208 may also assess the need for adapting thresholds or rules and may accordingly perform necessary actions. The feedback assimilation module 208 may assess the need for modifying rules or thresholds using self-learning and observations (past and present). In an embodiment, if the effectiveness of a template is less than a certain threshold, and the contributing factor was a particular KPI which did not match the NS-TMPLT-RQST, then the feedback assimilation module 208 may adjust a KPI-MATCH-SCORE. In another embodiment, if the effectiveness of a template is less than a certain threshold, and there were many contributing factors (without any one factor being dominant, then the feedback assimilation module 208 may adjust the BASIC-NSLT-MATCH-LOWER-THRES (in case a BASIC-NSLT was used after enrichment) or ADAPTED-NSLT-MATCH-LOWER-THRES (in case an ADAPTED-NSLT was used). If new implications were found during modification of the template to make it suitable, the feedback assimilation module 208 may need to update a MODIF-IMPLIC-TABLE. Further, if a modified template was found to be effective (i.e. greater than a threshold), then the feedback assimilation module 208 includes the modified template in a list of ADAPTED-NSLTs. In case the feedback assimilation module 208 determines that a TARGET-SLA-KPI adherence of a certain set of services alone were poor, the feedback assimilation module 208 may modify the service mapping guidelines in the slice template.

The feedback assimilation module 208 may also trigger the configuration module 204 to make the necessary updates to the identified thresholds and rules in the template and configuration repository 212. The feedback assimilation module 208 may also trigger the configuration module 204 to update effectiveness of the template that was used in the template and configuration repository 212.

Thereafter, the template controller 140, at step 310, adapts the one or more APPROP-NSLTs based on the determined modifications. The template maintenance module 210 may perform the necessary adjustments and updates. The template maintenance module 210 may modify or remove templates based on inputs received from the feedback assimilation module 208, provisioned rules, policy, and self-learning. By way of an example, a particular NSSLT may have a certain resource allocation guidelines and may have a latency supported range of 20-30 millisecond. Additionally, changes to resource allocation guidelines was not successful in the past for the NSSLT. In this case, the template maintenance module 210 may simply modify the latency supported range to reflect the observed latency values. Similarly, if a certain NSSLT indicated that sharing is allowed, but after sharing began, the effectiveness for the NSSLT dropped below a threshold, the template maintenance module 210 may update the NSSLT to indicate that sharing is not allowed.

The template maintenance module 210 may also takes into consideration self-learning and historical data, i.e., modifications done to the templates in the past and the consequences (for example, increase or decrease in effectiveness, new implications found, other issues that arose, etc.), and then the template maintenance module 210 performs appropriate modifications. The template maintenance module 210 may also stores template modifications done in the template and configuration repository 212 for future use.

The template maintenance module 210 may also modify one or more thresholds and one or more rules. Based on the inputs received from the feedback assimilation module 208, the configuration module 204 updates the relevant thresholds and rules taking into consideration historical data and self-learning (e.g., using well known machine learning techniques and/or effectiveness of updates done in the past for a similar situation). For example, if an update to KPI-SPLIT-RULES done in the past and the resulting ADAPT-KPI-SPLIT-RULES was not successful as it resulted in too many KPI violations, the configuration module 204 may either ignore updates to ADAPT-KPI-SPLIT-RULES or may opt for a conservative update to ADAPT-KPI-SPLIT-RULES.

KPI-SPLIT-RULES may indicate weightage or ratio of split of the KPIs based on the sub-net type (for example, a RAN sub-net may require 30% of the latency and a core sub-net may require 40% of the latency). It should be noted that the sum of one or more value ranges for a particular parameter may not match the value for the network slice in NSTMPLT-RQST-CONTENTS, but the network slice template provider module 206 may take this into consideration while choosing the right combination of sub-nets. By way of an example, if end-to-end latency should be less 40 millisecond, a RAN slice sub-net latency is determined to be 15-20 millisecond, transport sub-net latency is determined to be 5-10 millisecond and core sub-net latency is determined to be 15-25 millisecond, the cumulative range may turns out to be 35-55 millisecond, such that the upper limit is more than the end-to-end latency requirement of 40 millisecond.

Figure 4A:
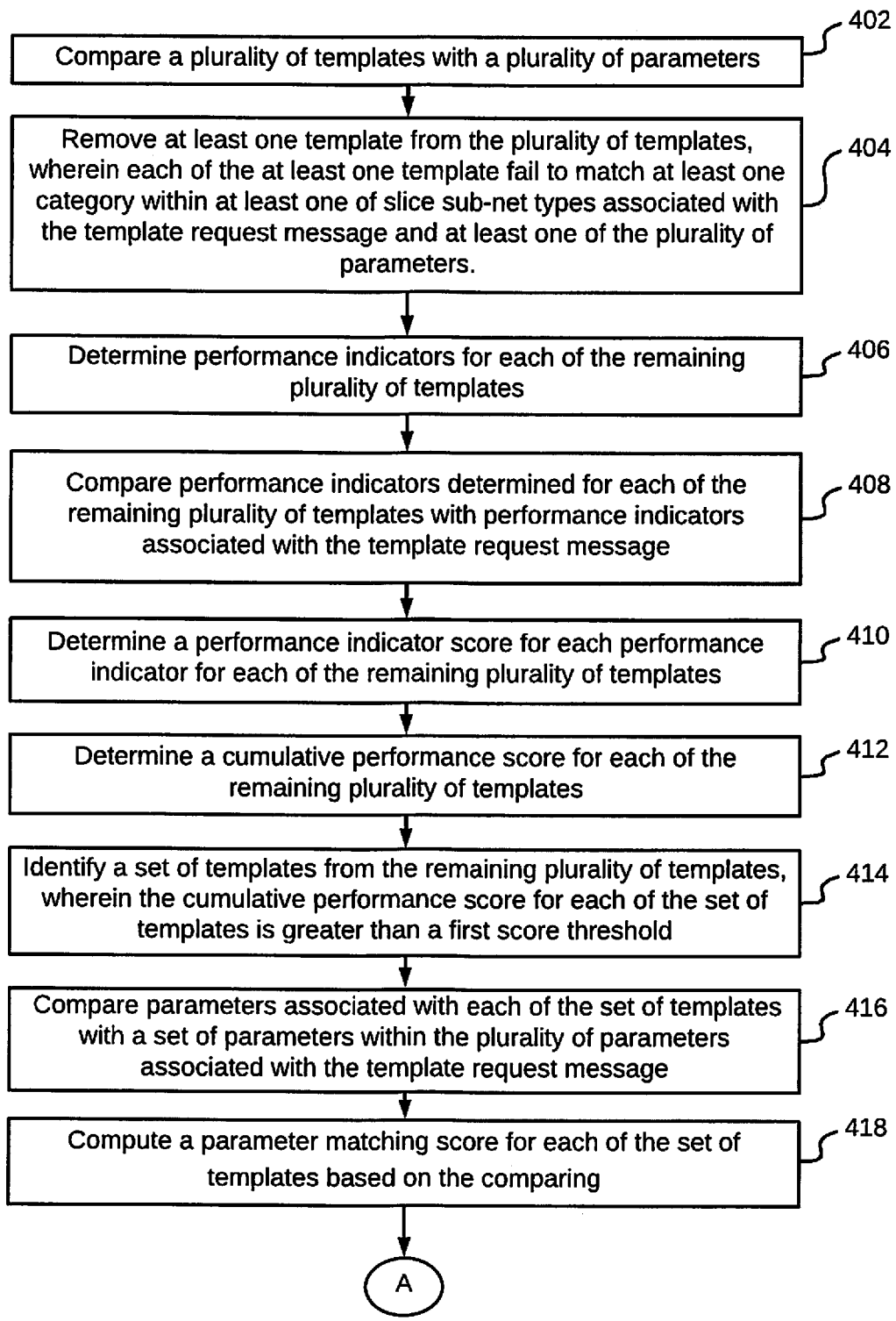
FIGS. 4A and 4B is a flowchart of a method for identifying one or more network slice templates based on a template request message, in accordance with an embodiment.
Figure 4B:
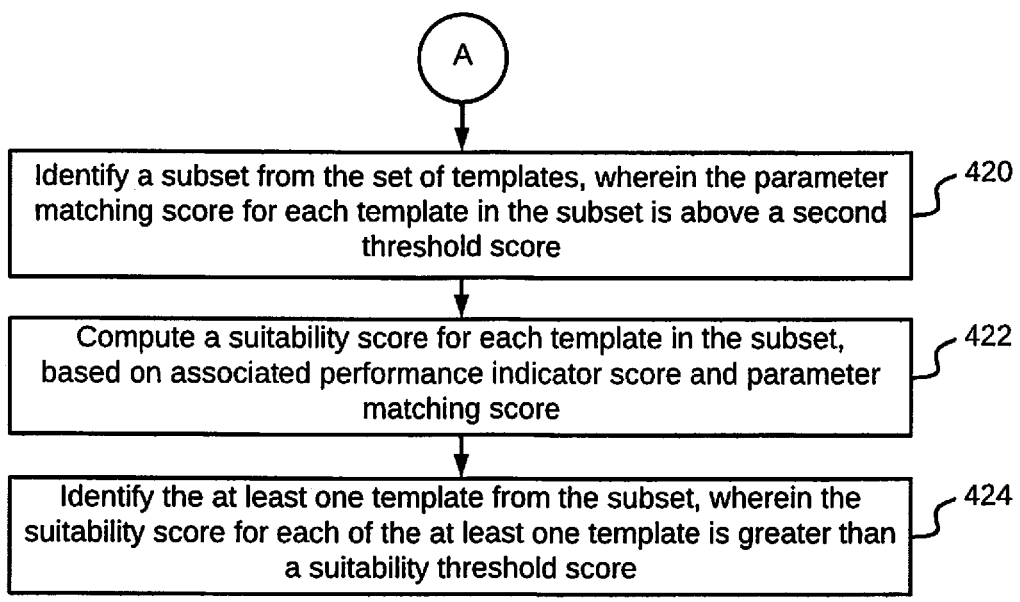

Referring now to FIGS. 4A and 4B, a flowchart of a method for identifying one or more NSLTs based on a template request message is illustrated, in accordance with an embodiment. As discussed in FIG. 3, the template controller 140 may extract a plurality of parameters from a template data within an NS-TMPLT-RQST. In an embodiment, the extraction of the plurality of parameters may be based on provisioned rules and mapping tables that may be pre-configured. The template data within the NS-TMPLT-RQST may include one or more of service categories to be supported (SERV-TYPE), performance requirements (TARGET-SLA-KPI), capacity (CAP), user density (USER-DEN), isolation and sharing levels (ISO-SHARING), mobility requirements (MOB-RQMT), security and policy requirements (SEC-POL-RQMTS), and additional characteristics (ADDTNL-CHAR). The ADDTNL-CHAR includes one or more of cost of operation, priority, preemption, and reliability. One or more of the contents within the template data are the plurality of parameters.

At step 402, the plurality of parameters extracted from the NS-TMPLT-RQST are compared with parameters associated with a plurality of templates. At step 404, one or more templates from the plurality of templates are removed. The one or more templates are removed as each such template fails to match one or more categories within one or more of slice sub-net types associated with the NS-TMPLT-RQST or one or more of the plurality of parameters. A slice sub-net type, for example, may include RAN sub-net type, a Core sub-net type, or a Transport sub-net type. Further, for the RAN sub-net type, examples of one or more categories may include, but are not limited to Wireless Fidelity (Wi-Fi) or cellular.

In an embodiment, at first, the network slice template provider module 206 fetches a list of NSLTs available (and are usable) in the template and configuration repository 212. An NSLT may be one of a BASIC-NSLT or an ADAPTED-NSLT. One or more NSLTs whose constituent slice sub-net types match with the NS-TMPLT-RQST are selected from the list of NSLTs. Thereafter, from the one or more NSLTs, the network slice template provider module 206 removes a set of NSLTs that are not suitable by checking the relevant requirements in NS-TMPLT-RQST, based on a criteria fetched from BASIC-TMPLT-FILTERS or ADAPTED-TMPLT-FILTERS which is stored in the template and configuration repository 212. By way of an example, if the NS-TMPLT-RQST includes a requirement for a cellular RAN subnet, then all NSLTs which have Wi-Fi as the RAN sub-net type are removed. In a similar manner, if the NS-TMPLT-RQST includes a requirement that a core is to be located only in the network edge, then one or more NSLTs for which core sub-net is not in the network edge, are removed from the set of NSLTs.

After removing the one or more templates, performance indicators are determined for each of the remaining plurality of templates at step 406. The performance indicators, for example, may be KPIs. At step 408, performance indicators determined for each of the remaining plurality of templates may be compared with performance indicators associated with the NS-TMPLT-RQST. Based on the comparing, a performance indicator score is determined for each performance indicator for each of the remaining plurality of templates at step 410.

In an embodiment, the network slice template provider module 206 may compares value of each KPI in a TARGET-SLA-KPI extracted from the NS-TMPLT-RQST with corresponding value of the KPI in each NSLT remaining in the set of NSLTs, after removal of the one or more NSLTs. The scores (KPI-MATCH-SCORE) to be assigned to an NSLT may be based on a KPI-MATCH-TABLE, which may indicate scores, for example, based on the percentage difference between the TARGET-SLA-KPI and the value supported in the NSLT. The KPI-MATCH-TABLE may be common for all KPIs. Alternatively, there may be different KPI-MATCH-TABLEs for different KPIs. In an exemplary embodiment, a KPI-MATCH-TABLE is depicted below as table 1.

TABLE 1

| Percentage Differerence (Difference = particular KPI value in TARGET-SLA-KPI − corresponding average value of that KPI supported in an NSLT) | KPI-MATCH-SCORE (Suitability score) Score on a scale of 1-5 (if NSLT is suitable) |
|---|---|
| 0 | 2 |
| 1-10 | 3 |
| 11-20 | 4 |
| >20 | 5 |
| −10 to −1 | 1 |
| −20 to −10 | 0 |
| <−20 | −1 |

In the above table, a KPI-MATCH-SCORE of "−1" indicates that template would be unsuitable and should be removed. It should be noted that in table 1, the percentage difference may also take into account the lowest value of the KPI in the NSLT instead of the average value. By way of an example, for a latency requirement of less than 40 millisecond (i.e., latency of 39 millisecond) in the NS-TMPT-RQST, the suitability score as computed for a BASIC-NSLT using the table 1 is depicted below in table 2.

TABLE 2

| BASIC-NSLT-ID | Latency Supported by the BASIC-NSLT | Difference between latency in NS-TMPLT-RQST and lowest value of latency the in BASIC-NSLT | KPI-MATCH-SCORE |
|---|---|---|---|
| 1 | 40-50 millisecond | (39 − 45)/39 = −15% | 0 |
| 4 | 50-70 millisecond | (39 − 60)/39 = −54% | −1 (unsuitable) |
| 9 | 30-40 millisecond | (39 − 35)/39 = 10% | 3 |
| 12 | 25-35 millisecond | (39 − 30)/39 = 23% | 5 |

In a similar manner, KPI-MATCH-SCORES may be assigned or computed for other KPIs (for example, throughput, etc.). As discussed above, the BASIC-NSLT may indicate ranges of supported values for certain parameters (for example, latency or throughput) or specific values which indicate an upper or lower limit (for example, packet loss). Alternatively, the KPI-MATCH-SCORE may be computed based on the absolute difference between the KPI value in the NS-TMPLT-RQST and the lowest (or) average value of that KPI-MATCH-SCORE in the BASIC-NSLT, using a correspondingly appropriate KPI-MATCH-TABLE. The KPI-MATCH-SCORE score may also be computed using other means, for example, by using a weighted difference between the value supported by the NSLT and the value required in the NS-TMPLT-RQST.

In case a particular KPI as required in the NS-TMPLT-RQST is not included in the NSLT, the network slice template provider module 206 updates this info in KPI-NOT-INCL-LIST, but still considers the NSLT as suitable as long as the number of KPIs in KPI-NOT-INCL-LIST is less than KPI-NOT-INCL-THRSHLD (otherwise, it considers the NSLT to be not suitable). If any NSLT has to be removed in this step due to unsuitability, the network slice template provider module 206 removes them from the list of suitable templates (but stores them separately).

Based on the performance indicator score determined for each performance indicator for each of the remaining plurality of templates, a cumulative performance score is determined for each of the remaining plurality of templates at step 412. At step 414, a set of templates are identified from the remaining plurality of templates. The set of templates are identified, such that, the cumulative performance score for each of the set of templates is greater than a first score threshold.

In an embodiment, for each NSLT that is suitable considering all KPIs, the network slice template provider module 206 computes aggregated suitability score (also termed as the cumulative performance score) of all KPIs. For a given BASIC-NSLT, the aggregated suitability score may be computed using equation 1 given below:

$$\text{AGGREG-KPI-MATCH-SCORE(aggregated suitability score)} = \text{Sum of all KPI-MATCH-SCOREs} \quad (1)$$

The AGGREG-KPI-MATCH-SCORE is then compared with SCALED-THRES-NSLT-AGGREG-KPI-SCORE, which is the scaled down value of a THRES-NSLT-AGGREG-KPI-SCORE to account for the number of KPIs present in a KPI-NOT-INCL-LIST. The scaling may be performed by using the equation 2 given below:

$$\text{SCALED-THRES-NSLT-AGGREG-KPI-SCORE} = \text{THRES-NSLT-AGGREG-KPI-SCORE} * [1-(\text{Epsilon}*\text{number of KPIs in KPI-NOT-INCL-LIST})/(\text{number of KPIs in NS-TMPLT-RQST})] \quad (2)$$

In the equation 2, Epsilon is in the range (0,1) which is provisioned. Epsilon denotes the inclination to make modifications to the NSLT to ensure KPI compliance (for those KPIs which are not specified in the NSLT), and thereby make it suitable. A lower value of Epsilon indicates less inclination to make modifications to ensure KPI compliance for the KPIs not present in NSLT. By way of an example, if one KPI is present in the KPI-NOT-INCL-LIST and total KPIs present in the NS-TMPLT-RQST is four, the value of Epsilon is 0.4. The computation of this value is depicted in equation 3 given below:

$$\text{SCALED-THRES-NSLT-AGGREG-KPI-SCORE} = \text{THRES-NSLT-AGGREG-KPI-SCORE} * [1-(1*0.4)/(4)] = \text{THRES-NSLT-AGGREG-KPI-SCORE} * 0.9 \quad (3)$$

At step 416, parameters associated with each of the set of templates is compared with a set of parameters within the plurality of parameters associated with the NS-TMPLT-RQST. In an embodiment, the set of parameters are the parameters that remain after the one or more parameters used for comparison at the step 402 have been removed. Based on the comparison, a parameter matching score is computed for each of the set of templates at step 418. At step 420, a subset is identified from the set of templates. The parameter matching score for each template in the subset is above a second threshold score.

Based on cumulative performance score and parameter matching score, a suitability score may be computed for each template in the subset, at step 422. At step 424, the one or more NSLTs are identified from the subset. The suitability score for each of the one or more NSLTs is greater than a suitability threshold score.

In an embodiment, the network slice template provider module 206 selects NSLTs for which AGGREG-KPI-MATCH-SCORE is greater than SCALED-THRES-NSLT-AGGREG-KPI-SCORE. The network slice template provider module 206 then compares the remaining requirements or parameters in the NS-TMPLT-RQST (apart from the SLA or KPIs) with relevant contents of each remaining NSLT. Such a comparison may involve comparison at the e2e network slice template level (i.e. NSLT), or examining one or more relevant slice sub-net templates or on or more NSSTs that are part of the NSLT. By way of an example, if the requirement in the NS-TMPLT-RQST is to have a RAN sub-net to support certain security level, then the comparison has to be done with the constituent RAN sub-net template that is part of the NSLT.

Some of the parameters may actually only be constraints, for example, a core sub-net may be present only in the network edge. A plurality of scenarios are possible for each requirement or parameter in the NS-TMPLT-RQST. In one scenario, the requirement in the NS-TMPLT-RQST for the parameter (for example, security level) may exactly match with the corresponding parameter in the NSLT. In this case, no further action is required for this parameter, and the network slice template provider module 206 may further proceeds with checking the next parameter.

In another scenario, the requirement in the NS-TMPLT-RQST may not be specified in the NSLT. In this case, a consistency check is performed if the requirement in NS-TMPLT-RQST contradicts/conflicts any other specification in the NSLT. For example, such a check could be requirement for content caching or other capabilities at the edge, while such capability is not specified in the core slice sub-net template (or) there are constraints are specified in the NSLT for resource allocation at the edge, SERV-TYPE requires seamless mobility, while only "limited mobility" is supported in the RAN, isolation level required is "high", but the RAN sub-net template in the NSLT indicates use of unlicensed spectrum only, etc. If there are such conflicts, then the NSLT is marked as "unsuitable", otherwise the not-present parameter is included in the PARAM-ENRICH-LIST.

In yet another scenario, the requirement in the NS-TMPLT-RQST for the parameter (for example, security level) may not match, and may be less than (or) may not fulfill the requirement as specified in the corresponding parameter in the NSLT. In this case, the network slice template provider module 206 checks for the feasibility of modifying the template to meet the requirement specified in the NS-TMPLT-RQST for that parameter. By way of an example, such a feasibility check may include checking for any conflicts, for example, if resource sharing is indicated as "not allowed", and the RAN-subnet indicates spectrum usage is "unlicensed" or RAN sub-net type indicates "Wi-Fi", or if any of the sub-nets indicates that it can be shared across slices. If there is a conflict, then the NSLT is marked as "unsuitable." By way of another example, such a feasibility check may include checking for one or more implications, for example, if mobility level supported is "stationary" and what is required in the NS-TMPLT-RQST is "full mobility support." This requires multiple modifications in the RAN and core sub-net and may have implications in the network functions in the core sub-net. Thus, the network slice template provider module 206 may check policy, provisioned rules, and learnings to determine whether such changes are allowed.

In another scenario, the requirement in the NS-TMPLT-RQST for the parameter (for example, security level) is more than a match for the corresponding parameter in an ADAPTED-NSLT. In this case, there may be two possibilities. First, the better match is good to have, for example, reliability supported in the NSLT is greater than what is requested in the NS-TMPLT-RQST. Second, the better match has implications, for example, security level indicated is higher, which might have implications on the services to be supported in the slice, mobility level requested is "stationary," for which the NSLT provides "full mobility support". The feasibility checks as well as the conditions stated above may be done using FEAS-CHECK-CONDNS and a MODIF-IMPLIC-TABLE.

For each of the NSLTs that are found to be suitable, the network slice template provider module 206 consolidates the list of matching parameters, not matching parameters (that require a modification to the NSLT), and the corresponding implications, if any. The network slice template provider module 206 may also consolidate the details of superior matching parameters (i.e., more than what is required) without any modifications. The network slice template provider module 206 may also computes an aggregated matching score using equation 4 given below:

$$\text{AGGREG-PARAM-MATCH-SCORE} = \text{Weighted sum of PARAM-MATCH-SCORE for each of the parameters in the NS-TMPLT-RQST} \quad (4)$$

The PARAM-MATCH-SCORE for each parameter may be determined using the table 3 depicted below, for example. The weights may be assigned based on policy or provisioned rules.

TABLE 3

| Score | PARAM-MATCH-SCORE |
| --- | --- |
| 5 | Exact match |
| 4 | Greater match without implications |
| 3 | Parameter not specified in the NSLT, with feasibility to "enrich" |
| 2 | Greater match with implications |
| 1 | Lower match with feasibility to modify the template |
| 0 | Lower match with no feasibility, or parameter not specified in NSLT, with no feasibility to "enrich" |

Thereafter, for all those NSLTs, for which the AGGREG-PARAM-MATCH-SCORE is greater than AGGREG-PARAM-SCORE-THRES, the network slice template provider module 206 computes the cumulative suitability score (CUMUL-MATCH-SCORE). The CUMUL-MATCH-SCORE may be computed using the equation 5 given below:

$$\text{CUMUL-MATCH-SCORE} = \{[(\text{AGGREG-KPI-MATCH-SCORE})*\text{alpha}] + [\text{AGGREG-PARAM-MATCH-SCORE}*\text{beta}]\}*\text{gamma} \quad (5)$$

where,
alpha and beta are weighting factors in the range (0,1), such that, alpha+beta=1.

gamma is a function F (not matching parameters, implications, entries in PARAM-ENRICH-LIST), where the function F may compute a simple weighted average of number of not matching of implications and number of entries in PARAM-ENRICH-LIST. Alternatively, the function F may employ complex computations considering the correlation between each matching parameter and implication, the extent of not-matching, etc.

The network slice template provider module 206 then prepares the list of NSLTs (BASIC-NSLT-LIST for BASIC-NSLTs and ADAPTED-NSLT-LIST for ADAPTED-NSLTs), for which, CUMUL-MATCH-SCORE is greater than BASIC-NSLT-MATCH-LOWER-THRES or ADAPTED-NSLT-MATCH-LOWER-THRES respectively.

With regards to BASIC-NSLTs and the ADAPTED-NSLTs, same weighting factors and thresholds may be used. Alternatively, a different set of thresholds may be used. Additionally, for each ADAPTED-NSLTs the network slice template provider module 206 may compute an ADJUSTED-CUMUL-MATCH-SCORE. In an exemplary embodiment, the ADJUSTED-CUMUL-MATCH-SCORE may be computed using the equation 6 given below:

$$\text{ADJUSTED-CUMUL-MATCH-SCORE} = \text{CUMUL-MATCH-SCORE} * \text{EFFECTIVENESS-FACTOR} \quad (6)$$

In the above equation, the CUMUL-MATCH-SCORE is determined based on the equation 5, as explained above. The EFFECTIVENESS-FACTOR is a factor which denotes the effectiveness of using the ADAPTED-NSLT. This factor may be a simple value in the range (0,1) or it may be a set of values associated with a set of conditions. The conditions may indicate KPI or parameter values, and the appropriate value from the set of values may be chosen based on the conditions matched for the current NS-TMPLT-RQST.

The network slice template provider module 206 may then prepare the list of ADAPTED-NSLTs (ADAPTED-NSLT-LIST), such that, ADJUSTED-CUMUL-MATCH-SCORE, for each such ADAPTED-NSLT is greater than the ADAPTED-NSLT-MATCH-LOWER-THRES. The network slice template provider module 206 may further consolidate for each of the ADAPTED-NSLTs in ADAPTED-NSLT-LIST, the corresponding KPI-NOT-INCL-LIST, PARAM-ENRICH-LIST, a list of parameters that do not match and require a modification in the ADAPTED-NSLT, corresponding implications (if any), and details of superior matching parameters. This is further explained in detail in conjunction with FIG. 5.

Figure 5:
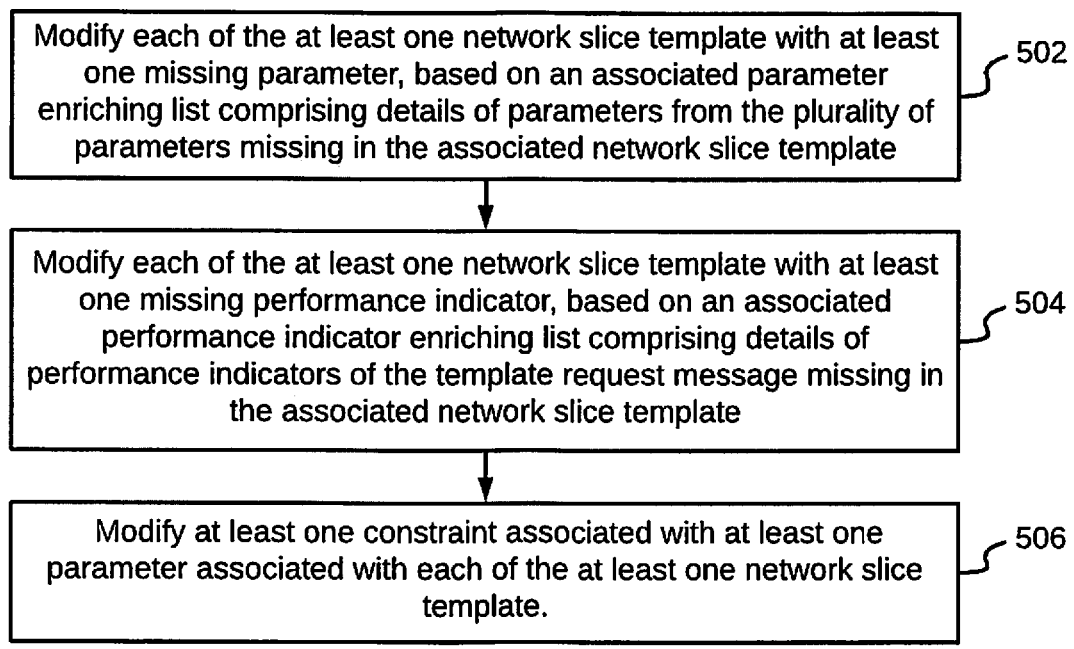
FIG. 5 is a flowchart of a method for modifying one or more network slice templates identified based on a template request message, in accordance with an embodiment.

Referring now to FIG. 5, a flowchart of a method for modifying one or more network slice templates identified based on a template request message is illustrated, in accordance with an embodiment. At step 502, each of one or more network slice templates that have one or more missing parameters is modified. The one or more network slice templates may be modified based on an associated parameter enriching list that includes details of parameters from the plurality of parameters missing in the associated network slice template. At step 504, each of the one or more network slice templates with one or more missing performance indicators are modified. This modifications is performed based on an associated performance indicator enriching list that includes details of performance indicators of the template request message missing in the associated network slice template. At step 506, one or more constraint associated with one or more parameters associated with each of the one or more network slice templates are modified.

In an embodiment, for BASIC-NSLTs, the network slice template provider module 206 may extract the BASIC-NSLT-LIST based on the CUMUL-MATCH-SCOREs, and the ADAPTED-NSLT-LIST based on ADJUSTED-CUMUL-MATCH-SCOREs. For the BASIC-NSLT in BASIC-NSLT-LIST that has the highest CUMUL-MATCH-SCORE, the network slice template provider module 206 may enrich the BASIC-NSLT. The BASIC-NSLT may be enriched by using the PARAM-ENRICH-LIST using value of the parameters taken from the corresponding parameter in the NS-TMPLT-RQST. The BASIC-NSLT may further be enriched by using the KPI-NOT-INCL-LIST with the value of the parameter taken from the corresponding KPI value in the NS-TMPLT-RQST. The network slice template provider module 206 may also Include any conditions or constraints corresponding to the parameters or KPIs enriched as specified in provisioned/adapted rules and/or policy. The resulting enriched templates are denoted as ENRICHED-BASIC-NSLTs. In other words, the BASIC-NSLTs are modified.

In a similar manner, for ADAPTED-NSLTs, the network slice template provider module 206 may start with an ADAPTED-NSLT in the ADAPTED-NSLT-LIST that has the highest ADJUSTED-CUMUL-MATCH-SCORE. The network slice template provider module 206 may then enrich the ADAPTED-NSLT using the same methodology as for the BASIC-NSLT, The resulting enriched templates are denoted as ENRICHED-ADAPTED-NSLTs. In other words, the ADAPTED-NSLTs are modified.

The network slice template provider module 206 checks for any preferences specified in policy for an NSLT (BASIC-NSLT or ADAPTED-NSLT) based on factors such as subscriber class, service types, location, etc. The network slice template provider module 206 may also check for the corresponding parameters in the NS-TMPLT-RQST. Such preference may indicate affinity (positive preference) or anti-affinity (negative preference). The network slice template provider module 206 may then provide the ENRICHED-BASIC-NSLTs and the ENRICHED-ADAPTED-NSLTs along with one or more preferences determined above and relevant details (conditions, constraints, list of not-matching parameters and KPIs, the KPI-NOT-INCL-LIST, the PARAM-ENRICH-LIST, etc.).

Figure 6:
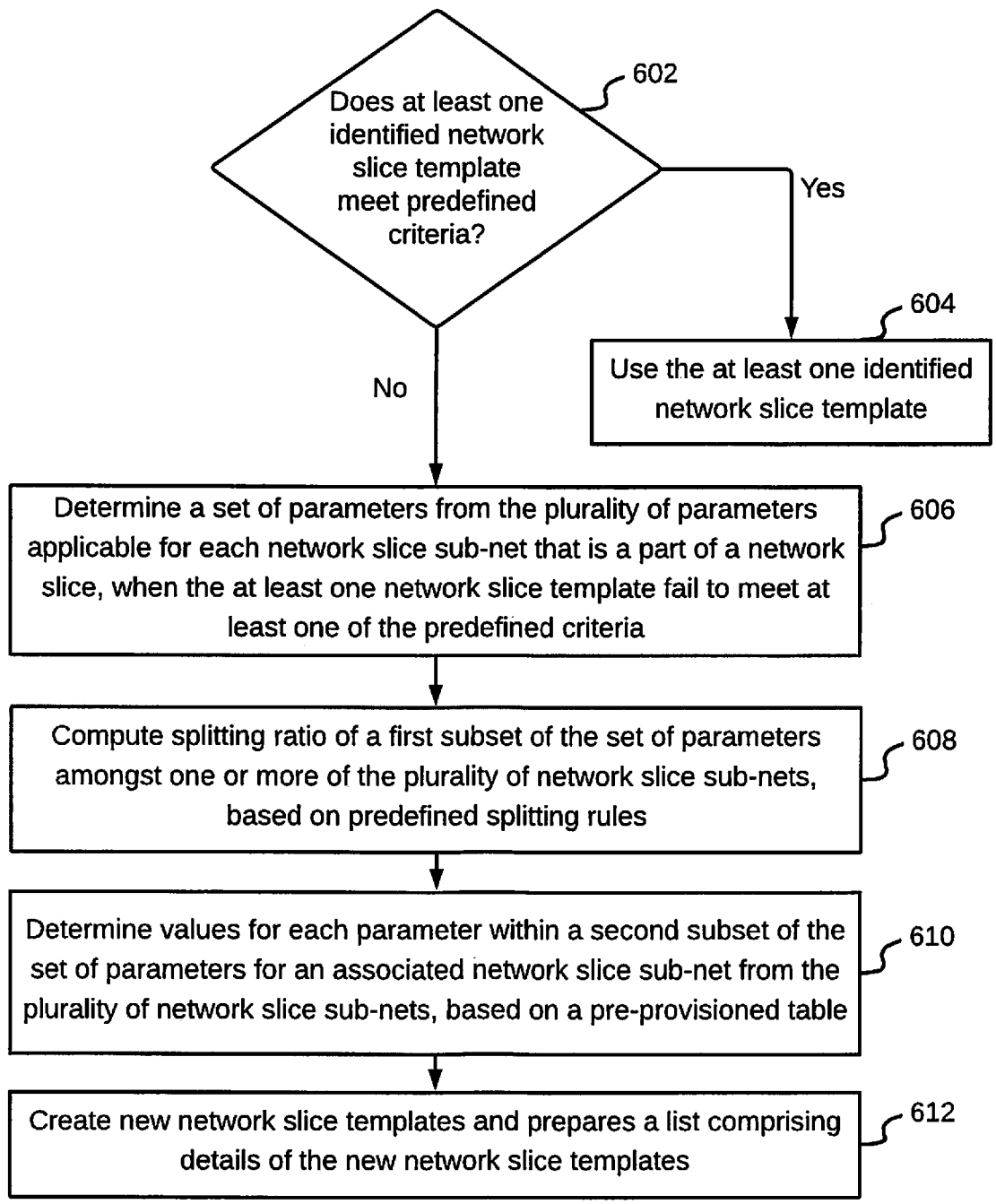
FIG. 6 is a flowchart of a method for creating one or more network slice templates based on a template request message, in accordance with an embodiment.

Referring now to FIG. 6, a flowchart of a method for creating one or more network slice templates based on a template request message is illustrated, in accordance with an embodiment. At step 602, a check is performed to determine whether the identified one or more network slice templates meet predefined criteria. Referring back to FIGS. 4A, 4B, and 5, the predefined criteria may include the number of ENRICHED-BASIC-NSLTs being less than a minimum number of BASIC-NSLTs (MIN-NBR-BASIC-NSLT). The predefined criteria may also include the number of ENRICHED-ADAPTED-NSLTs being less than a minimum number of ADAPTED-NSLTs (MIN-NBR-ADAPTED-NSLT). The predefined criteria may further include the number of ENRICHED-ADAPTED-NSLTs or ENRICHED-ADAPT-TMPLTs each having a percentage match with the NS-TMPLT-RQST greater than MATCH-HIGHER-THRES is less than a minimum threshold (say, MIN-NBR-MATCHED-NSLT).

If the one or more identified network slice templates meet each of the predefined criteria, at step 604, the one or more identified network slice templates are used. However, when the one or more identified network slice templates fail to meet one or more of the predefined criteria, a set of parameters is determined from the plurality of parameters applicable for each network slice sub-net that is a part of a network slice, at step 606. Based on predefined splitting rules, at step 608, splitting ratio of a first subset of the set of parameters amongst one or more of the plurality of network slice sub-nets is computed. Thereafter, at step 610, values for each parameter within a second subset of the set of parameters for an associated network slice sub-net from the plurality of network slice sub-nets are determined, based on a pre-provisioned table. At step 612, new network slice templates are created and a list that includes details of the new network slice templates is prepared.

In an embodiment, the network slice template provider module 206 derives one or more key parameters and values or ranges for each network slice sub-net and forms slice subnet parameters (SS-PARAMS) for each network slice-subnet. To this end, the network slice template provider module 206 fetches the TARGET-SLA-KPI parameters, from TMPLT-RQST-CONTENTS, which have to be split across the different sub-nets. Examples of such parameters may include one or more of, but are not limited to latency, packet-drops, or jitter, etc. The network slice template provider module 206 may use pre-provisioned tables.

Based on the ADAPT-KPI-SPLIT-RULES, the network slice template provider module 206 may determine one or more allowed value ranges of the TARGET-SLA-KPI parameters. The ADAPT-KPI-SPLIT-RULES may be created from the KPI-SPLIT-RULES based on self-learning. Additionally, for each of the remaining parameters in NS-TMPLT-RQST, the network slice template provider module 206 determines values of the corresponding parameter as applicable for the slice sub-net. For example, the parameter USER-DEN may be relevant to RAN sub-nets only, while CAP may be relevant to RAN, transport and core sub-nets. Similarly, ISO-SHARING may indicate requirements for complete isolation at physical resource level which may be relevant to core and transport sub-nets. E2E reliability level may require a higher value in each slice sub-net, so that the E2E reliability may be met (for example, 99.999% reliability in three slice sub-nets would translate into an e2e reliability of 99.997%). Thus, policy may indicate whether each of the slice sub-net should have a reliability which is greater than or equal to e2e reliability, or a value which is at a percentage greater than e2e reliability. This may further depend on the slice type or subscriber class that the slice may cater to. The network slice template provider module 206 may use a pre-provisioned table (for example, a SLICE-SUBNET-PARAM-MAPPING-TABLE) which may have been adapted by the feedback assimilation module 208 based on inputs and feedback from the end-to-end orchestrator 138.

Thereafter, the network slice template provider module 206 determines one or more basic network slice subnet templates (BASIC-NSSLTs) for a particular network slice sub-net using one or more steps as described in FIGS. 4A and 4B. However, the network slice template provider module 206 uses BASIC-NSSLTs instead of BASIC-NSLTs and SS-PARAMS for that sub-net type instead of the NS-TMPLT-RQST. Additionally, threshold values and scaling factors may also be different from that described in FIGS. 4A and 4B. The list determined by the network slice template provider module 206 is ENRICHED-BASIC-NSSLTs. In a similar manner, the network slice template provider module 206 determines one or more adapted network slice subnet templates (ADAPT-NSSLTs) for the particular network slice sub-net using one or more steps as described in FIGS. 4A and 4B. However, the network slice template provider module 206 uses ADAPT-NSSLTs instead of ADAPT-NSLTs and SS-PARAMS for that sub-net type instead of the NS-TMPLT-RQST. Additionally, threshold values and scaling factors may also be different from that described in FIGS. 4A and 4B. The list determined by the network slice template provider module 206 is ENRICHED-ADAPTED-NSSLTs.

The network slice template provider module 206 then creates new network slice templates (FORMED-NS-TMPLTs) and prepares FORMED-NS-TMPLT-LIST using one or more options. One of the options may include using the list of ENRICHED-BASIC-NSSLTs and ENRICHED-ADAPTED-NSSLTs for each sub-net type and create FORMED-NS-TMPLTs. To this end, the network slice template provider module 206 prepares a COMB-NS-TMPLT using the combinations of the ENRICHED-BASIC-NSSLTs and the ENRICHED-ADAPTED-NSSLTs for different sub-nets that ensure compliance to the slice-level KPIs specified in the NS-TMPLT-RQST. Additionally, for each COMB-NS-TMPLT, the network slice template provider module 206 checks for any conflict or contradiction across the chosen sub-net templates. For example, transport sub-net template may indicate a certain latency, but core sub-net template may indicate allocation of resources across different data center locations (edge, regional), making the latency range specified for the transport sub-net infeasible. If any such conflict exists, the network slice template provider module 206 may discard that COMB-NS-TMPLT.

Further, for each of the COMB-NS-TMPLT remaining after the previous step, the network slice template provider module 206 computes the KPI values, and determine the KPI-MATCH-SCORE for each KPI. The AGGREG-KPI-MATCH-SCORE is determined as the Sum of all KPI-MATCH-SCOREs. The network slice template provider module 206 then compares the AGGREG-KPI-MATCH-SCORE against THRES-AGGREG-FORM-KPI-SCORE. For the COMB-NS-TMPLTs whose AGGREG-KPI-MATCH-SCORE is greater than THRES-AGGREG-FORM-KPI-SCORE, the network slice template provider module 206 determines the AGGREG-PARAM-MATCH-SCORE as the sum of AGGREG-PARAM-MATCH-SCORE of each constituent NSSLT in the COMB-NS-TMPLT. The network slice template provider module 206 includes those COMB-NS-TMPLTs, for which AGGREG-PARAM-MATCH-SCORE is greater than THRE-FORM-AGGREG-PARAM-MATCH-SCORE, as FORMED-NS-TMPLTs in FORMED-NS-TMPLT-LIST.

Another option that can be used by the network slice template provider module 206 is that if sufficient FORMED-NS-TMPLTs are not determined, i.e., the number of FORMED-NS-TMPLTs is less than the FORMED-NS-TMPLT-THRES, the network slice template provider module 206 forms appropriate NSSLTs (for every sub-net as needed), by selecting those BASIC-NSSLTs whose CUMUL-MATCH-SCORE is greater than omega*BASIC-NSLT-MATCH-LOWER-THRES. Omega is a provisioned factor, for example, a value in the range (0.6,0.9), and making suitable modifications (as allowed by Policy and provisioned rules) to make its CUMUL-MATCH-SCORE greater than BASIC-NSLT-MATCH-LOWER-THRES.

Such modification may also include 'borrowing' some properties from another NSSLT. In other words, the network slice template provider module 206 may form a composite NSSLT from 2 NSSLTs. Subsequently, the network slice template provider module 206 performs the necessary enrichment similar to those described for network slice templates in FIGS. 4A and 4B. The network slice template provider module 206 may then use these FORMED-NSSLTs and carry out the steps the first option, instead of ENRICHED-BASIC-NSLTs.

Figure 7:
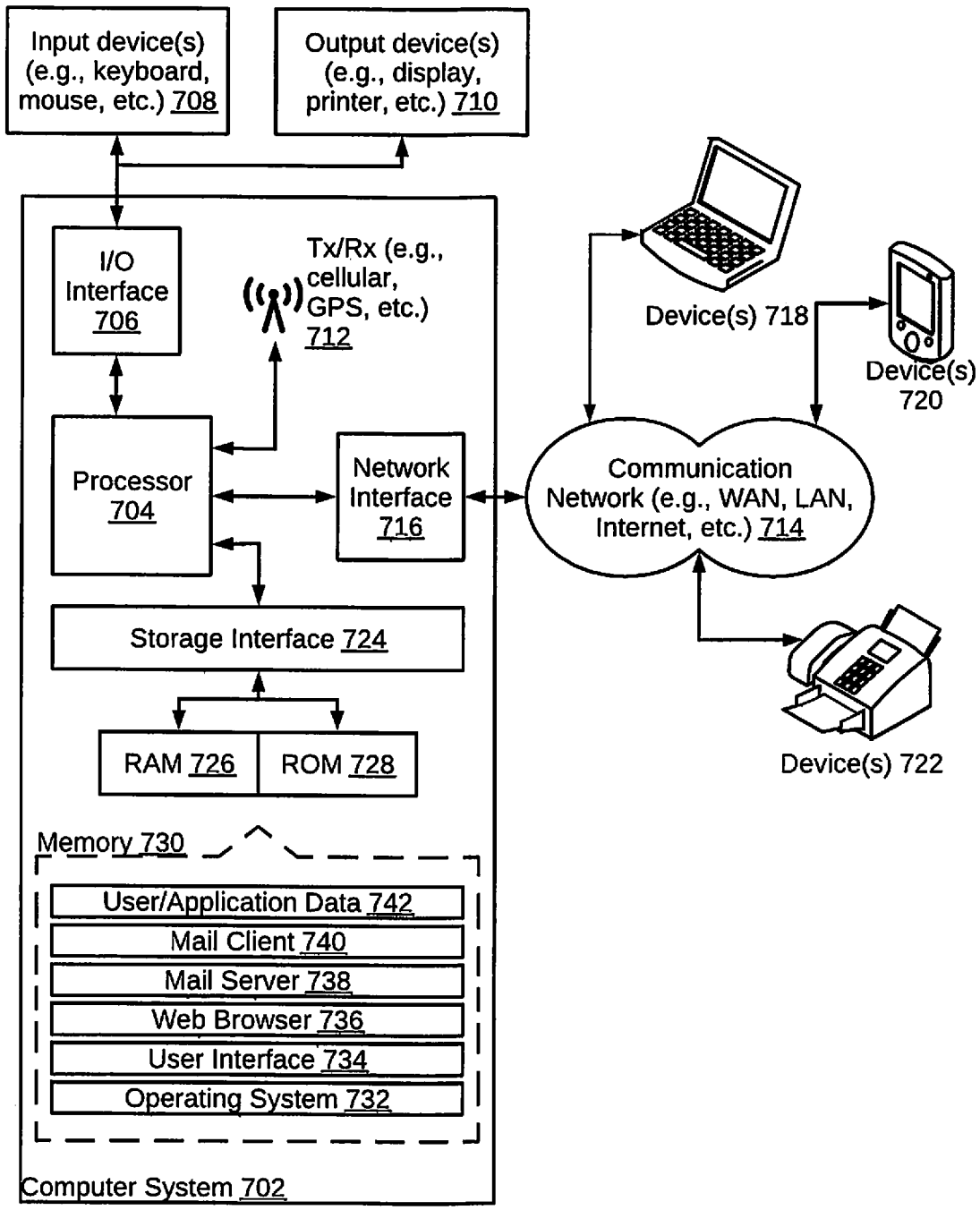
FIG. 7 illustrates a block diagram of an exemplary computer system for implementing various embodiments.

FIG. 7 is a block diagram of an exemplary computer system for implementing various embodiments. Computer system 702 may include a central processing unit ("CPU" or "processor") 704. Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x. etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as Internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system for maintenance of network slice templates for slice orchestration. The invention provides a mechanism of creation and maintenance of network slice templates (end-to-end as well as slice sub-nets) for improved Service KPI management and optimal use of network resources. This is achieved by template request assessment for determining requirements for network slice and subnet specific templates. This includes extracting information about the key parameters to be considered while determining one or more appropriate network slice templates and deriving key parameters and values or ranges to be considered for each constituent slice sub-net while determining the one or more appropriate slice sub-net templates.

The creation and maintenance of network slice templates is further achieved by determining suitable template (network slice and slice subnet). This further includes determining one or more suitable basic templates and determining of one or more suitable adapted (and used) templates. Based on the above steps, a new template is formed by enriching the basic template based on information extracted or derived from the request or by merging two or more basic or adapted templates suitably (i.e., form a composite template), and/or determine one or more suitable adapted templates. The above actions may be performed separately for templates associated with network slices and for each constituent network slice-subnet.

The creation and maintenance of network slice templates is further achieved by assessing effectiveness of the template based on performance feedback after usage and making necessary adjustments thereafter. This may include assessing the performance of the slices that used the template, and the services that were mapped to the slice. This may further include assessing the need for change in the template for future use, and/or extraction rules, and/or parameters and thresholds used during template selection and fine-tuning the relevant attributes based on the assessment.

The specification has described method and system for maintenance of network slice templates for slice orchestration. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of maintenance of network slice templates for slice orchestration, the method comprising:
    extracting, by a template controller, a plurality of parameters from a template data within a template request message;
    determining, by the template controller, at least one network slice template from a plurality of templates, based on comparison of the plurality of parameters with parameters associated with the plurality of templates, wherein the determining the at least one network slice template comprises:
        comparing the plurality of templates with the plurality of parameters;
        removing at least one template from the plurality of templates, wherein each of the at least one template fail to match at least one category within at least one of slice sub-net types associated with the template request message and at least one of the plurality of parameters;
        determining performance indicators for each of the remaining plurality of templates;
        comparing performance indicators determined for each of the remaining plurality of templates with performance indicators associated with the template request message;
        determining a performance indicator score for each performance indicator for each of the remaining plurality of templates based on the comparing;
        determining a cumulative performance score for each of the remaining plurality of templates based on the performance indicator score determined for each performance indicator for each of the remaining plurality of templates; and
        identifying a set of templates from the remaining plurality of templates, wherein the cumulative performance score for each template in the identified set of templates is greater than a first score threshold;
    receiving, by the template controller, performance feedback for each of the at least one network slice template based on usage of the at least one network slice template;
    determining, by the template controller, modifications required to be performed on the at least one network slice template, based on the performance feedback; and
    adapting, by the template controller, the at least one network slice template based on the determined modifications.

2. The method of claim 1, wherein the template data comprises at least one of service categories to be supported, performance requirements, capacity, user density, isolation and sharing levels, mobility requirements, security and policy requirements, or additional characteristics comprising at least one of cost of operation, priority, pre-emption, or reliability.

3. The method of claim 1, wherein each of the plurality of templates is at least one of a basic template and an adapted template.

4. The method of claim 1, further comprising:
    comparing parameters associated with each of the set of templates with the plurality of parameters associated with template request message;
    computing a parameter matching score for each of the set of templates based on the comparison; and
    identifying a subset from the set of templates, wherein parameter matching score for each template in the subset is above a second threshold score.

5. The method of claim 4, further comprising:
    computing a suitability score for each template in the subset based on associated performance indicator score and parameter matching score; and
    identifying the at least one network slice template from subset, wherein the suitability score for each template in the subset is greater than a suitability threshold score.

6. The method of claim 5, further comprising:
    modifying each of the at least one network slice template with at least one missing parameter, based on an associated parameter enriching list comprising details of parameters from the plurality of parameters missing in the associated network slice template; and
    modifying each of the at least one network slice template with at least one missing performance indicator, based on an associated performance indicator enriching list comprising details of performance indicators of the template request message missing in the associated network slice template; and
    modify at least one constraint associated with one or more of the at least one missing parameter and at least one missing performance indicator.

7. The method of claim 6, further comprising modifying at least one constraint associated with at least one parameter associated with each of the at least one network slice template.

8. The method of claim 1, further comprising determining whether the at least one network slice template identified meet predefined criteria.

9. The method of claim 8, further comprising:
    determining a set of parameters from the plurality of parameters applicable for each network slice sub-net that is a part of a network slice, when the at least one network slice template fail to meet at least one of the predefined criteria;
    computing splitting ratio of a first subset of the set of parameters amongst one or more of the plurality of network slice sub-nets, based on predefined splitting rules; and
    determining values for each parameter within a second subset of the set of parameters for an associated network slice sub-net from the plurality of network slice sub-nets, based on a pre-provisioned table.

10. A system of maintenance of network slice templates for slice orchestration, the system comprising:
    at least one processor; and
    a memory communicatively coupled to the processor, wherein the memory stores processor instructions, which, on execution, causes the processor to:
    extract a plurality of parameters from a template data within a template request message;
    determine at least one network slice template from a plurality of templates, based on comparison of the plurality of parameters with parameters associated with the plurality of templates, wherein to determine the at least one network slice template, the processor instructions further cause the processor to:
        compare the plurality of templates with the plurality of parameters;
        remove at least one template from the plurality of templates, wherein each of the at least one template fail to match at least one category within at least one of slice sub-net types associated with the template request message and at least one of the plurality of parameters;
determine performance indicators for each of the remaining plurality of templates;
compare performance indicators determined for each of the remaining plurality of templates with performance indicators associated with the template request message;
determine a performance indicator score for each performance indicator for each of the remaining plurality of templates based on the comparing;
determine a cumulative performance score for each of the remaining plurality of templates based on the performance indicator score determined for each performance indicator for each of the remaining plurality of templates; and
identify a set of templates from the remaining plurality of templates, wherein the cumulative performance score for each template in the identified set of templates is greater than a first score threshold;
receive performance feedback for each of the at least one network slice template based on usage of the at least one network slice template;
determine modifications required to be performed on the at least one network slice template, based on the performance feedback; and
adapt the at least one network slice template based on the determined modifications.

11. The system of claim 10, wherein the template data comprises at least one of service categories to be supported, performance requirements, capacity, user density, isolation and sharing levels, mobility requirements, security and policy requirements, or additional characteristics comprising at least one of cost of operation, priority, pre-emption, or reliability.

12. The system of claim 10, wherein the processor instructions further cause the processor to:
compare parameters associated with each of the set of templates with the plurality of parameters associated with template request message;
compute a parameter matching score for each of the set of templates based on the comparison; and
identify a subset from the set of templates, wherein parameter matching score for each template in the subset is above a second threshold score.

13. The system of claim 12, wherein the processor instructions further cause the processor to:
compute a suitability score for each template in the subset based on associated performance indicator score and parameter matching score; and
identify the at least one network slice template from subset, wherein the suitability score for each template in the subset is greater than a suitability threshold score.

14. The system of claim 13, wherein the processor instructions further cause the processor to:
modify each of the at least one network slice template with at least one missing parameter, based on an associated parameter enriching list comprising details of parameters from the plurality of parameters missing in the associated network slice template;
modify each of the at least one network slice template with at least one missing performance indicator, based on an associated performance indicator enriching list comprising details of performance indicators of the template request message missing in the associated network slice template; and
modify at least one constraint associated with one or more of the at least one missing parameter and at least one missing performance indicator.

15. The system of claim 10, wherein the processor instructions further cause the processor to:
determine whether the at least one network slice template identified meet predefined criteria;
determine a set of parameters from the plurality of parameters applicable for each network slice sub-net that is a part of a network slice, when the at least one network slice template fail to meet at least one of the predefined criteria;
compute splitting ratio of a first subset of the set of parameters amongst one or more of the plurality of network slice sub-nets, based on predefined splitting rules; and
determine values for each parameter within a second subset of the set of parameters for an associated network slice sub-net from the plurality of network slice sub-nets, based on a pre-provisioned table.

16. A non-transitory computer-readable storage medium having stored thereon, a set of computer-executable instructions causing a computer comprising one or more processors to perform steps comprising:
extract a plurality of parameters from a template data within a template request message;
determine at least one network slice template from a plurality of templates, based on comparison of the plurality of parameters with parameters associated with the plurality of templates, wherein the determining the at least one network slice template comprises:
comparing the plurality of templates with the plurality of parameters;
removing at least one template from the plurality of templates, wherein each of the at least one template fail to match at least one category within at least one of slice sub-net types associated with the template request message and at least one of the plurality of parameters;
determining performance indicators for each of the remaining plurality of templates;
comparing performance indicators determined for each of the remaining plurality of templates with performance indicators associated with the template request message;
determining a performance indicator score for each performance indicator for each of the remaining plurality of templates based on the comparing;
determining a cumulative performance score for each of the remaining plurality of templates based on the performance indicator score determined for each performance indicator for each of the remaining plurality of templates; and
identifying a set of templates from the remaining plurality of templates, wherein the cumulative performance score for each template in the identified set of templates is greater than a first score threshold;
receive performance feedback for each of the at least one network slice template based on usage of the at least one network slice template;
determine modifications required to be performed on the at least one network slice template, based on the performance feedback; and
adapt the at least one network slice template based on the determined modifications.

* * * * *